Dec. 11, 1934.    J. F. PAGENDARM    1,983,770
MACHINE FOR GENERATING DIES OF IRREGULAR SURFACE
Filed May 26, 1930    2 Sheets-Sheet 1

INVENTOR.
John F. Pagendarm.
BY
Townsend, Loftus & Abbott
ATTORNEYS.

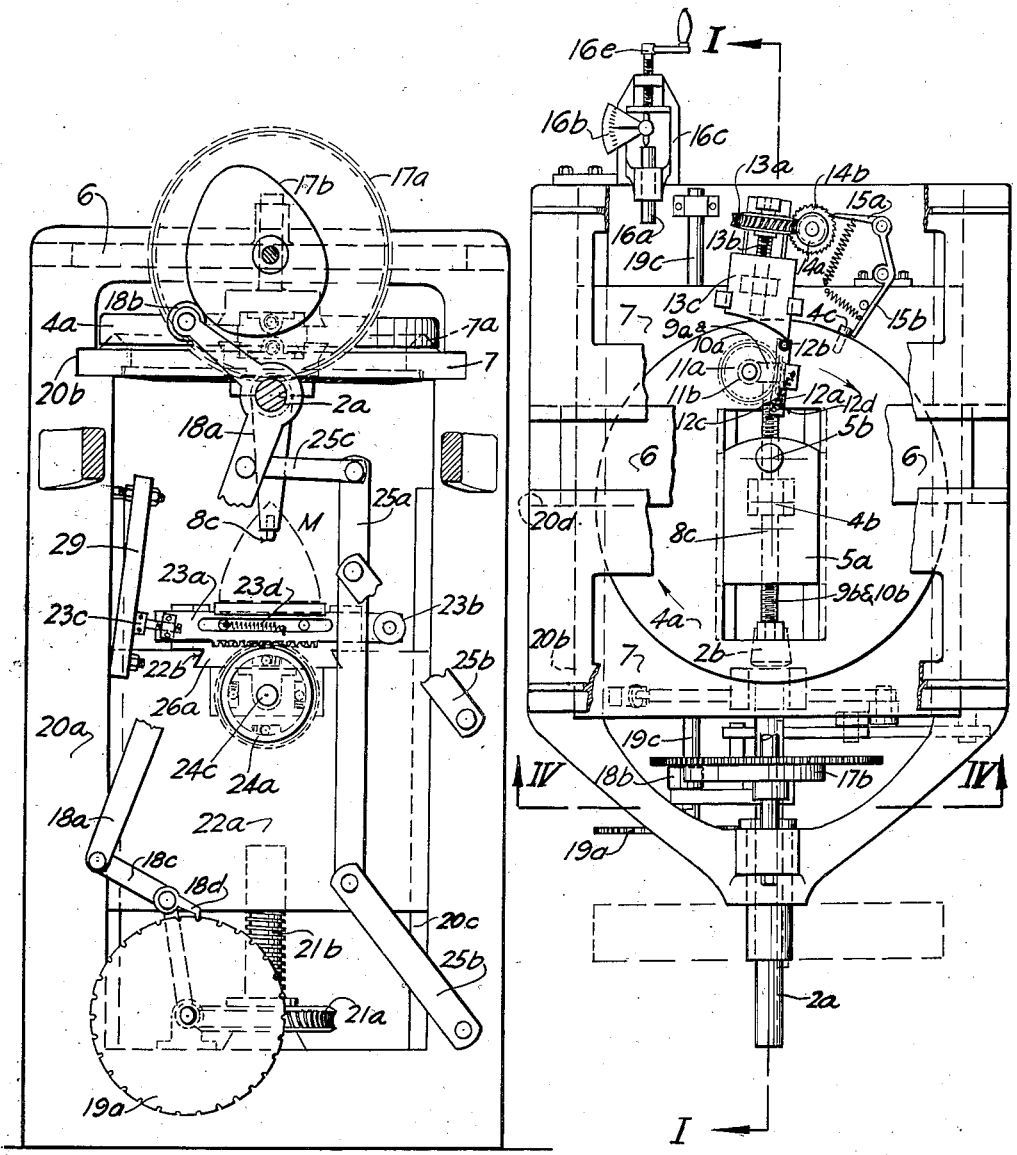
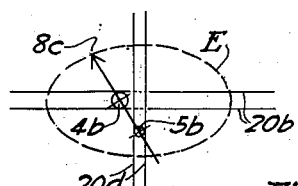
Fig. 4.
Fig. 5.
Fig. 3.

Patented Dec. 11, 1934

1,983,770

UNITED STATES PATENT OFFICE 1,983,770

MACHINE FOR GENERATING DIES OF IRREGULAR SURFACE

John F. Pagendarm, San Francisco, Calif., assignor to American Woodlite Corporation, a corporation of California Application May 26, 1930, Serial No. 455,692

23 Claims. (Cl. 90—31)

This invention relates to a machine for generating quadric surfaces and refers particularly to a machine for cutting punches and dies used in the manufacture of reflectors for light or other forms of radiant energy.

Reflectors employed in certain light projectors are formed with complex quadric surfaces, and the manufacture of such reflectors at reasonable costs and with a high degree of accuracy requires the production of accurately shaped punches and dies. Heretofore there has been no machine in use capable of generating the complex surfaces which are desired for these reflectors. For example, for the manufacture of certain reflectors, dies and punches are required having elliptical elementary sections whose major and minor axes diminish in vertical sequence from the maximum values on a median plane to zero values at a point in a plane which is perpendicular to said median plane and which contains the major axes of the largest ellipse.

It is a general object of the present invention to provide a machine for generating or cutting castings into predetermined desired surfaces of quadric form and to provide a machine which is capable of forming the desired surfaces automatically and with exceptional accuracy.

More specifically, an object of the present invention is to provide a means for translating a cutting tool through a predetermined elliptical path, and to provide means by which the successive elliptical paths traversed by the cutting tool may be of different parameters, that is, the magnitude of one or both of the axes of such elliptical paths may be progressively varied in a predetermined manner.

It is a further object of the present invention to provide a means by which these changes in the successive elliptical paths traversed by the cutters may be caused to take place both automatically and while the cutter tool is in motion.

It is a further object of the present invention to provide a means by which these changes of the successive elliptical paths inscribed by the cutter may be effected always in the same limited portion or arc of the successive elliptical paths, to the end that during the greater part of the motion of the cutter there is no change in the parameter of the elliptical path being inscribed thereby.

A further object of the present invention is to provide a means by which the magnitudes of the major and minor axes of the elliptical paths of a cutting tool of a machine may be changed at the same or different rates, and progressively changing rates, and also to provide means by which the magnitude of the axes of such ellipses may be diminished simultaneously to zero upon the completion of the cutting of the successive family of ellipses of progressively decreasing parameters.

A further object of the invention is to provide a means for automatically moving the work to be cut during the cutting operations and in proper synchronism with motions of the cutting tool.

A further object of the invention is to provide a machine in which the work may be advanced relative to the cutting tool in a predetermined curved path, such as a quadratic path corresponding to a parabola or other conic section.

It is a further object of the present invention to cause the advance of the work with respect to the cutting tool to take place in steps so that the work is stationary during the major part of the time that the cutter is prescribing a single ellipse, and to provide means by which one step of motion may be imparted to the work between each elliptical path prescribed by the cutter, and to further provide means by which the increments of advance or motion of the work relative to the cutter may all be caused to take place while the cutting tool is in the same predetermined arc of the successive ellipses, and also to cause such motions of the work to take place during the portion of the motion of the cutter which is utilized for changing the major and minor axes of the ellipses prescribed by the cutter.

The present invention together with various further objects and advantages of the same will best be understood from the description of a preferred form or example of a machine embodying the invention. For this purpose I have hereafter described, with reference to the accompanying drawings, a preferred form or example of a machine embodying this invention.

In the drawings:

Figure 3 is a plan view of the machine, certain parts being broken away.

Figure 4 is a vertical section taken on the line IV—IV of Figure 3 certain parts being broken away.

Figure 5 is an ideograph illustrating the principle that is employed in causing the tool to prescribe an ellipse.

Figure 1:
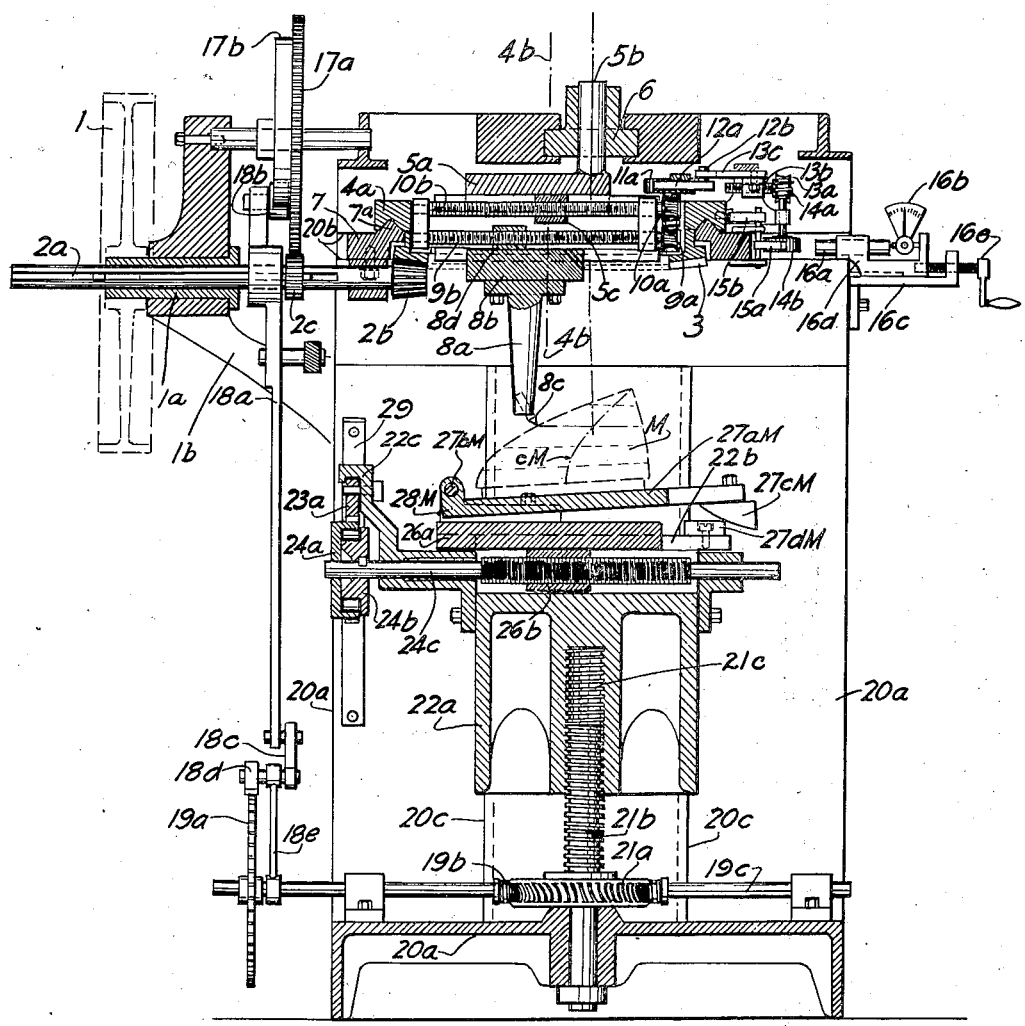
Figure 1 is an elevation mainly in vertical section of the machine showing a punch form upon the work holder or carriage.

Throughout the specifications the numerals refer to the major parts of the invention, while the postscript letters refer to accessory parts of said major parts. The subscript capital letter M pertains to the punch form or male, and the subscript letter F pertains to the female or die form, either of which is being shaped by the cutting tool. Identical numerals and subscripts refer to identical parts of the invention in the several figures.

Referring more particularly to the drawings, I show a main frame $20a$. A tool holder $8a$ is mounted in the frame $20a$ and is provided for holding the pointed cutting tool $8c$ in cutting position. This tool is caused to travel in an elliptical path by the means hereafter described.

The tool holder $8a$ is mounted in a rotating member $4a$ which is in the form of a disc. The means for mounting the holder $8a$ upon the plate $4a$ are automatically adjusted in operation to position the cutting point of the cutter $8c$ at a desired distance from the axis $4b$ of the disc. The disc $4a$ is shown as rotatably mounted on an annular track-way $7a$ provided on a plate 7 and the disc $4a$ is provided with a bevelled gear 3 engaging a bevelled pinion $2b$ on a shaft $2a$ which provides a means for revolving the disc continuously at a uniform speed during operation of the machine.

For driving the shaft $2a$ there is provided a pulley 1 which is secured to a hollow shaft $1a$ journaled in a bracket $1b$ in the frame of the machine. The shaft $2a$ is keyed to the shaft $1a$ against rotation with relation to the pulley and hollow shaft $1a$, but is slidable axially with respect to the shaft $1a$.

If the distance of the cutting point of the cutter $8c$ from the axis $4b$—$4b$ of the revolving disc $4a$ was, in operation, maintained constant and a simple rotary motion imparted to the disc $4a$ by the shaft $2a$, the cutter $8c$ would prescribe a circle. In order to cause the cutter $8c$ to prescribe an ellipse, means are provided for reciprocating the rotating member or disc $4a$ in a plane perpendicular to its axis during operation, and a complete reciprocation is caused to take place once during each revolution of the disc $4a$. In this manner the motion of the cutter $8c$ is made to follow the path of an ellipse.

The means for causing such reciprocations of the rotating disc $4a$ consists of the following. The plate 7 is mounted in slots $20b$ in a frame $20a$ so that it may be reciprocated. A second plate 6 disposed above the plate 7 is mounted for reciprocation in a plane parallel to that of the plate 7 but in the direction at right angles to the direction of the reciprocations of the plate 7. The plate 6 is connected with the rotating disc or member $4a$ by means of a slide $5a$ having a pin $5b$ eccentric of the axis of the disc $4a$, which slide $5a$ is slidable relative to the disc $4a$ but is held rigid with the rotary disc while the machine is prescribing an ellipse of fixed parameter. This relative position is obtained by means of screw $10b$ and threaded collar or nut $5c$, the latter being rigid with respect to slide $5a$.

The adjustment between the slide $5a$ and the disc $4a$ is utilized for changing one of the axes of the elliptical path prescribed by the cutter $8c$. The pin $5b$ which is eccentric to the axis of rotation of the disc $4a$ is journaled at its upper end in the plate 6 and said slide $5a$ is revolvable about the axis of said pin $5b$. In order to form true elliptic arcs, the plane passing through the axis of the pin $5b$ in the direction of the axis of sliding freedom should pass through the axis $4b$—$4b$ of disc $4a$, which plane should include the cutter point $8c$. Thus, the cutter point $8c$, axis $4b$ of disc $4a$ and center $5b$ of the pin on slide $5a$ must all be in the same vertical plane if the successive ellipses of the cutter $8c$ are prescribed relative to the same axes.

In operation, the rotation of the disc $4a$ causes the plates 6 and 7 to reciprocate due to its eccentric connection by the pin $5b$ of slide $5a$ with the sliding plate 6. The plate 7 carries the rotary disc $4a$ with it, with the result that the cutter $8c$ in operation prescribes an elliptical path.

Referring to Figure 5, the manner in which motion is effected is clearly shown. The point of the cutter $8c$, the axis $4b$ of the disc $4a$ and the center $5b$ of the pin on slide $5a$ may be considered as all points moving in a common plane of reference. The point $8c$ prescribes an ellipse E about a fixed center at the intersection of the vertical planes through the axes of freedom of plates 6 and 7. One axis of the ellipse is twice the interval $8c$—$5b$ and the other axis is twice the interval $8c$—$4b$. By varying the lengths of these intervals, ellipses of known size may be prescribed by the cutter point $8c$. In other words, one axis of an ellipse prescribed by cutter $8c$ is equal to twice the distance of the cutter point $8c$ from the axis $4b$ of the disc $4a$, while the other axis of the ellipse is equal to the magnitude of the stroke imparted to the plate 7 plus or minus the first diameter. The location of the major axis of the ellipse E, with respect to the center lines of the two guideways $20b$ and $20d$, depends on the position of the sliding center $5b$ in relation to the interval $4b$—$8c$. If $5b$ lies behind $4b$ with respect to $8c$, the major axis of the ellipse E will lie along the center line of the guideway $20b$, while if $5b$ lies between $4b$ and $8c$, the major axis of said ellipse will lie along the center line of the guideway $20d$. The above first mentioned relation of $5b$ to $4b$ is the one normally used in the generation of the quadric surfaces.

The raw material or work, either a punch casting M or die casting F, is mounted on a work holder or plate $27aM$ (or $27aF$). Means are provided in the apparatus for moving the work during the cutting operations in order that the motion of the cutter $8c$ in elliptical paths will be caused to cut upon the work M or F a quadric surface. The motion of the work is generally in a quadratic path i. e., the centers of the prescribed ellipses lie on the curve of a conic section and in the preferred form of the invention this quadric path is determined by three motions imparted to the holder, (1) a vertical motion, (2) a horizontal motion, and (3) a pivotal angular motion in a vertical direction.

In order to secure the said curved or quadric motion, the plate or work holder is secured by a pin $27bM$ (or $27bF$) to a plate $26a$. Plate $26a$ is slidably mounted on a bed plate or base member $22a$, the plate $26a$ sliding in the direction of one of the axes of the ellipses prescribed by the cutter $8c$. The bed plate $22a$ is vertically slidable upon guides $20c$ formed in the frame $20a$. Guides $20c$ are in fixed relation to the axis of the ellipses prescribed by cutter $8c$. It will be seen therefore that the work M (or F) may be given a motion which is the result of three components of motion, (1) the vertical motion of the bed $22a$, (2) the horizontal motion of the plate $26a$, and (3) the pivotal motion of the plate or holder $27aM$ (or $27aF$).

Now referring more particularly to Figures 1 and 4, the mechanism for causing these motions of the work table to take place and synchronizing the same with the motions of the cutter 8c comprise a cam 17b carried by a gear 17a, which gear is in turn rotated by a gear 2c mounted upon and driven by the shaft 2a. The gears 2c and 17a are so related to the motion of the cutter 8c as to cause the gears 17a to be revolved once during each complete revolution or formation of an ellipse by the cutter 8c. The cam 17b engages a roller 18b carried by the bell crank or lever 18a pivotally mounted on the shaft 2a so as to oscillate the bell crank once each revolution of the gear 17a. The bell crank 18a is connected by means of pivotal links 18c and 18e to the pawl 18d by means of which the oscillatory motion of the bell crank causes the pawl to periodically engage and rotate a notched disc 19a. The disc 19a is secured to a shaft 19c which is provided with the worm 19b. The worm 19b meshes with a worm gear 21a which is secured to and drives a screw 21b. The screw 21b extends into the threaded hole 21c formed in the bed plate 22a, whereby rotation of the screw 21b imparts vertical movement to the bed plate or base 22a. This mechanism is adapted to provide vertical motion for the work and the mechanism is so arranged that this intermittent vertical motion always takes place while the cutter 8c is in the same arc or forward phase of its elliptical motion.

The pawl 18d is arranged so that it may be reversed whereby opposite motion will be imparted to the notch disc 19a and consequently to the bed plate or base 22a.

The longitudinal motion of the plate 26a is cam actuated and the mechanism for effecting this motion together with the vertical component of motion imparted to the bed plate or base 22a and the pivotal motion of holder plate 27aM (or 27aF) permits the work to be advanced or moved relative to the cutter 8c in a curved or quadric path. For example, in the formation of a punch or die for the manufacture of a certain type of reflector, it is desirable to obtain a form which will have a median profile rearwardly of its apex in the form of a parabola or an elliptical arc, the remote focus of which is so distantly placed as to approach approximately a parabola. Also, a confocal hyperbolic arc is cut on the forward face thereof.

In the preferred form of the invention the machine therefore includes means for imparting a stepped horizontal motion to the slide 26a of constantly increasing or decreasing increments. It thus may be said that, disregarding the fact that the motion of the plate 26a and of the bed plate 22a are intermittent, the vertical motion of the bed plate 22a is at a constant velocity and the horizontal motion of the slide 26a is at constant acceleration or deceleration. If these two motions only were imparted to the work, it would move in the path of a parabola.

The motion is imparted to the slide 26a by means of the following mechanism. Slide 26a is operated by a screw 26b on the shaft 24c. The base 22a carries the bracket 22c which mounts the shaft 24c and also mounts the clutch and rack mechanism hereafter described. The shaft 24c is provided with a clutch drum 24b of a roller clutch of which 24a is the clutch wheel. The clutch is adapted to impart rotary motion to the shaft 24c, in one direction only. The clutch wheel 24a is geared to a rack 23a carried by the bracket 22c, which rack 23a is provided with a spring 23d by which it is normally urged towards a cam bar 29. The rack 23a is provided adjacent the cam bar 29 with an adjustable shoe 23c and at its opposite end is provided with a roller 23b. The cam bar 29 is attached to the frame 20a and is inclined slightly with respect to the vertical axis of the machine. The rack 23a in operation is operated by a beam 25a which forms part of a parallelogram including the links 25b which are pivoted to the frame 20a so that it is maintained in a vertical position during operation. The beam 25a is connected by the link 25c with the bell crank 18a.

In operation, since the bell crank 18a oscillates once during each revolution of the cutter 8c, as before described, the beam 25a is oscillated or reciprocated likewise once during each of such revolutions. On each reciprocation of the beam 25a it engages the roller 23b and pulls the rack 23a to a definite position to the right, as viewed in Figure 4. When the rack 23a is pulled to the right, as viewed in Figure 4, by the beam 25a, it operates to rotate shaft 24c through the clutch 24a, thereby moving the slide 26a. The amount of this motion imparted to the slide 26a depends upon the distance that rack 23a was permitted to return to the left of the machine on the previous reciprocation. Following the return of the beam 25a the rack is returned by the spring 23d until the shoe 23c engages the inclined bar 29. When the work is being elevated in operation it will therefore be seen that the distance that the rack is permitted to return decreases, while when the work is being lowered, the distance the rack is permitted to return will increase. Thus, the slide 26a in operation moves either with a constantly accelerated or decelerated rate.

In certain cases it is desired that the surfaces of the punch or die cut by the machine shall have elemental elliptical sections in planes which intersect at a distantly remote focus. To obtain this form of surface, there is involved a tilting, or tipping, of holder plates 27aM (or 27aF). The pivotal motion of plate 27aM (or 27aF) is cam actuated. In the punch form of holder, Fig. 1, 27cM is an appropriately curved shoe which, by the translational motion of plate 26a through hinge 27bM, is pulled across the fixed block 27dM. Similar motion is imparted to the die form 27aF, Fig. 2, by the travel of the edge of block 27cF across the curved face of block 27dF. As the slide 26a is moved in operation, the engagement of the cams on the work holder 27aM (or 27aF) with the fixed blocks on base 27dM (or 27dF) causes the work holder to be pivoted about the hinge 27bM, (or 27bF) imparting an angular motion to the work, thereby bringing the successive ellipses prescribed on the work in planes which intersect at a distantly remote focus.

Each of the motions imparted to the work is caused to take place while the cuting tool 8c is in the forward part of its path or within the same arc. In this manner the cutting operations may be continuous and all of the shifting of cutter 8c and the work in the machine take place in the same portion of the surface to be cut by the cutter. In certain punches and dies this portion of the surface is not utilized in forming a reflector.

Figure 2:
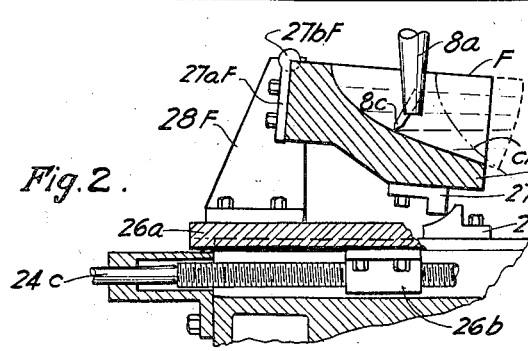
Figure 2 is a fragmental view showing in longitudinal section a die form upon a portion of a work holder or carriage.

Since Figure 2 shows a die F and Figure 1 shows a punch M, the direction of vertical motion in the two views is opposite, the punch M being lowered while the die is raised in the progress of cutting. This requires that the slope of the cam bar 28 be reversed when cutting a punch form.

Now referring more particularly to Figures 3 and 1, the means by which the axes of the ellipses prescribed by the cutting tool 8c may be progressively changed in operation is as follows:

The cutter 8c or cutter holder 8a is mounted on the disc 4a by the slide 8b. The slide 8b is provided with a nut 8d which engages a screw 9b which, when revolved, is capable of moving the holder 8a to or from the axis 4b of the disc 4a. The screw 9b is provided with the gear 9a which engages a worm 11b. The worm 11b is connected by means of a one-way clutch 11a, preferably of the ball or roller type, with a gear which engages a rack 12a, which rack is provided with means, such as a spring 12c for urging the same away from the axis of the disc 4a and provided with a contact roller 12b.

The rack 12a, clutch 11a, worm 11b and gear 9a are all mounted on the disc 4a and carried around therewith during the rotation of the disc.

Mounted on the slide 7 of the machine is a cam 13c which is adapted to engage the roller 12b on the rack 12a once during each rotation of the disc 4a and urge the rack 12a inwardly. When the rack 12a is urged inwardly by the cam 13c it rotates through the clutch and gear 11a, worm 11b and gear 9a on the screw 9b, thereby rotating the screw and moving the slide 8b carrying the cutter 8a. When the roller 12b passes beyond the cam 13c it is returned again towards the periphery of the disc 4a by the spring means 12c. During this motion of the rack the one-way clutch 11a releases to prevent the slide 8b from being moved.

The amount of motion thereby imparted to the slide 8b in each revolution of the disc 4a will therefore depend upon how far the cam 13c projects toward the center of the disc 4a.

Means are provided in the mechanism for advancing the cam 13c or retracting the same a predetermined distance during each revolution of the disc 4a to have the effect of accelerating or decelerating the amount of change in the distance of the cutter 8c from the axis of the disc 4a. This accelerating or decelerating change has a corresponding effect on the length of one of the axes of the ellipse prescribed by the cutter and is desired when the cutting tool is to operate upon work which is given an accelerated or decelerated horizontal movement in addition to a vertical motion during operation.

For moving the cam 13c a nut is provided engaging a screw 13b which in turn is provided with a worm gear 13a driven by a worm 14a. The worm 14a is rotated by a ratchet wheel 14b which is intermittently operated by the pawl 15a. The pawl 15a is operated by a lever 15b which is contacted once during each revolution of the disc 4a by a stud 4c on the disc 4a.

Since the movement of the ratchet wheel 14b and thereby the slide 13c is uniform, the change in the distance of cutter 8c in the axis of the disc 4a increases or decreases at a uniform rate in operation of the machine. The slide 13c and the cam 17b which operates the means for moving the work are related to each other so that the changes in the position of the cutter and the changes in the position of the work will both take place during one limited portion only of the revolution of the disc 4a.

The other axis of the ellipse is caused to be changed by changing the position of the slide 5a on the disc 4a, thereby changing the distance between the center of the pin 5b and the axis 4b of the disc 4a. For this purpose the slide 5a is provided with a nut 5c engaging a screw 10b parallel to the screw 9b. The screw 10b is provided with a gear 10a which also engages the worm 11b, whereby the slide 5a may be operated by the same mechanism used to move the slide 8b which carries the cutter 8c.

By providing different pitches to the screws 9b and 10b the slides 5a and 8b may be moved different amounts in operation and by reversing the direction of one screw relative to the other, the slides may be caused to move in opposite directions when this is desirable. By correct proportioning of the pitch of the screws 10b and 9b the major and minor axes of the progressive ellipses cut by the cutter 8c may be decreased from predetermined different values until they both approach zero at the same time. Also by the correct selection for the respective pitches of the screws 9b and 10b, the pin 5b on the slide 5a may be brought to the axis 4b of the disc 4a at the same moment when the point of the cutter 8c arrives at the axis 4b of the disc 4a, in which case a succession of ellipses will have been prescribed by the cutting tool 8c, all of which have their major axes in the same direction. By different proportioning of the screws 9b and 10b, the slide 5a may move the pin 5b by the center 4b of the disc 4a before the point of cutter 8c reaches the center disc 4a, in which case as the pin 5b passes the center 4b, the major axis of the progressive ellipses prescribed by the cutter 8c will be changed to the minor, the minor axis to the major axis, or in other words, the major axis of the ellipse will then be cut in the opposite direction.

Micrometric control equipment for use in connection with the reciprocative plate 7 is shown in Figures 1 and 3. Since the eccentric position of the center of revolving plate 4a with respect to pin 5b in slide 6 is an index of the elliptical diameters of the cutter 8c, and since plate 7 reciprocates with plate 4a, the distance from the right hand face of plate 7, Figure 1, to the right hand face of the frame 20a, Figure 1, is also an index of said diameters. In the micrometer control equipment, 16a is a plunger sliding in a journal 16d carried on a bracket 16c. The journal 16d has a feed screw 16e with suitable index head. A sensitive inside micrometer is shown at 16b. As the feed screw 16e advances the plunger 16a, contact is made thereby with the reciprocating plate 7 at the extreme right hand end of the latter's motion. When the gauge 16b indicates zero position, the index head on the screw 16e shows a length from which the diameters of the elliptical arc then being scribed is known.

It is to be understood that the necessary gibs, adjusting screws, gauges, and indicators which are commonly used by machinists familiar with the art are applied wherever desirable herein, to take up wear and to enable the machine as described to follow accurately the prescribed combination of movements.

While the particular form of the invention herein described is well adapted to carry out the objects of the present invention, it is to be understood that various modifications and changes may be made without departing from the invention and the invention includes all such changes and modifications as come within the scope of the appended claims.

Having thus described my invention, what I claim and desire to secure by Letters Patent is:

1. In an apparatus for generating quadric surfaces including a work holder, means for moving said work holder intermittently in one direction through like increments of motion, means for intermittently moving the work holding member in another direction at progressively changing increments, means for causing the respective motions in the different directions to take place substantially simultaneously, means for imparting an intermittent angular motion to the work holding member, and means for causing the intermittent angular motion imparted to the work holder to take place at progressively changing degrees.

2. In an apparatus for generating quadric surfaces comprising, a work holder, means for vertically moving the work holder, means for sliding the work holder horizontally, means for tilting the work holder, means for automatically operating the vertical moving means at like intervals, means for automatically operating the sliding means at progressively changing intervals, and means for automatically operating the tilting means, each of said means including means for synchronizing the same so that the respective motions take place substantially simultaneously.

3. An apparatus for generating quadric surfaces comprising a cutter, means for moving the cutter in elliptical arcs, means for changing the major and minor axes of the elliptical arcs progressively, said means including means for causing the changes in said axes to take place during the same portion of the respective elliptical arcs, said means also including means for causing the changes in said axes to take place in progressively changing rates, a work holder for positioning the work to be actuated upon by said cutter, means for intermittently moving the work holder in one direction at equal intervals, means for intermittently moving the work holder in another direction at progressively changing intervals, means for synchronizing the motions imparted to the work holder to cause the same to take place substantially simultaneously and during the changes in the major and minor axes of the elliptical arcs prescribed by said cutter, and means for imparting an intermittent angular motion to the work holder.

4. A machine for generating quadric surfaces, comprising a frame, a cutting tool attached to said frame, with means for moving said tool in a sequence of elliptic paths, the axes of which diminish intermittently in constantly increasing amounts, a work holder positioned before said cutting tool, screw feeds for moving said work holder vertically with uniform movements, means for advancing said work holder, both horizontally and angularly, with respect to the center and plane of said elliptic paths, and cam means for regulating the movement of said advancing means whereby the movement caused thereby will take place at uniformly accelerated rates.

5. The machine described in claim 4, above, in which the advancing means and cam means comprise a substantially straight cam bar, inclined to the said frame, a horizontally sliding bar opposing said cam bar and a one-way clutch operating therewith and connected to said work holder, whereby the successive equal vertical displacements of said work holder causes the said sliding bar to travel constantly changing distances to the said inclined cam bar, thereby causing feeding the work holder horizontally to take place in constantly increasing amounts; said movements being intermittent and in unison with the changes in said elliptic axes and presenting the work to the cutting tool along a quadratic path.

6. The machine described in claim 4, above, in which the means for moving the work angularly to the plane of the elliptic cutter consists of a cam bar and follower attached to the respective parts of the work holder, whereby horizontal sliding movement in the follower over the cam face induces angular movement in the work about a horizontal transverse axis on the work holder.

7. In a machine for cutting quadric surfaces, means for presenting work held therein along a parabolic path consisting of intermittent but uniform vertical displacements combined with horizontal displacements, which increase in constant amount with each vertical movement, comprising means for moving the work vertically in uniform increments, and means for moving the work horizontally with constantly increasing increments, the last means including a substantially straight cam bar which is fixed to the frame of the machine and inclined to the vertical axis and a reciprocating follower device adapted to abut the cam bar and thereby obtain constantly increasing amplitudes by means of uniform vertical displacements.

8. In an apparatus having a frame, a cutter, driving means therefor, and a base member vertically movable with relation to the cutter, the combination of a horizontally slidable plate mounted upon the base member, means for imparting uniformly increasing displacements to said plate in a horizontal direction, and cam means operating between the work holder and base member whereby said horizontal movement will impart angular movement to the work holder.

9. In an apparatus for generating quadric surfaces having a frame, a cutter mounted for movement in elliptical paths, driving means for the cutter, a base member, and means for moving the base member toward and away from the cutter, the combination of a plate slidably mounted on the base member, a work holder hinged to said plate for angular movement relative thereto, means for sliding said plate on the base member, a cam interposed between the work holder and base member whereby the work holder will move angularly during sliding of the plate, and connections between the said driving means and means for sliding the plate whereby the movement of the work will be in synchronism with that of the cutter and in uniformly varying amounts.

10. A machine for generating quadric surfaces comprising a cutting tool, means for translating the cutting tool in a sequence of elliptical paths, means for varying the parameters of said elliptical paths, and means controlling the operation of said second named means to effect a progressively changing rate of variation.

11. A machine for generating quadric surfaces comprising a cutting tool, means for translating the cutting tool in a sequence of elliptical paths, means for varying the parameters of said elliptical paths, said means being so positioned that the changes take place at the same point in each elliptical path, and means controlling the operation of said second named means to effect a progressively changing rate of variation.

12. In a machine of the character described, a cutting tool, means for moving the cutting tool in elliptical paths, means for changing the major and minor axes of the elliptical paths, and means controlling the operation of said second named means to effect a constantly varying rate of change.

13. In a machine of the character described, a cutting tool, means for moving the cutting tool in elliptical paths, means for changing simultaneously the major and minor axes of said paths, and means cooperating with said second named means to effect a constantly varying rate of change.

14. An apparatus for generating quadric surfaces comprising a cutter, a revolving member mounting said cutter, means for shifting the cutter toward and away from the axis of the revolving member, means for reciprocating the revolving member in a plane perpendicular to its axis during each revolution thereof, means for varying the stroke of said reciprocations, and means controlling the operation of said last named means to effect a progressively changing rate of variation.

15. An apparatus for generating quadric surfaces comprising a cutter, a revolving member mounting said cutter, means for moving the cutter toward or away from the axis of the revolving member periodically, means for reciprocating the revolving member in a plane perpendicular to its axis in synchronism with said periodic movement, means for varying the stroke of said reciprocations, and means controlling the operation of said first named means and said third named means to effect a progressively changing rate of variation whereby the cutter will describe a series of ellipses, the parameters of which vary in progressively changing amounts.

16. An apparatus for generating quadric surfaces which comprises a cutter, means for translating the cutter in elliptical paths, means for varying the parameters of said elliptical paths, a work holder for supporting work to be acted upon by said cutter, means for moving the work holder intermittently and automatically upon movement of the cutter, means acting with said second named means and means acting with said third named means to effect a progressive rate of variation of the said parameters and of the movement of said work holder.

17. A method of forming complex quadric surfaces, which consists of translating a cutting tool through elliptical paths in a fixed plane, causing the major and minor axes of said paths to change at uniformly varying rates, feeding the work to the cutting tool in the path of a conic section by controlling the rate of feed so as to bring about a constantly increasing rate in planes parallel with said elliptical paths and a uniform rate in planes perpendicular thereto.

18. A method of forming complex quadric surfaces which comprises translating a cutting tool through elliptical paths in a fixed plane, causing the major and minor axes of said paths to change at uniformly varying rates, and feeding work to the cutting tool in the path of a conic section by controlling the rate of feed in planes perpendicular to said elliptical paths and in planes parallel to said elliptical paths.

19. A machine for generating quadric surfaces comprising a frame, a holder adapted to position work along a prescribed quadric path, a tool mounted in said frame and adapted to cut a series of elliptic arcs on said work, the said cutting tool being mounted to follow prescribed circular paths with reference to a fixed center in a synchronized reciprocating plate, and means whereby the radii of said circular paths and the amplitudes of said reciprocations change with progressively increasing increments during a fixed stage of each circular path.

20. The machine described in claim 19 above, wherein the cutting tool is mounted on a worm connected through mechanical means with a driving rack and means for moving said rack a regularly increasing stroke at the completion of each circular stroke of the cutting tool, said moving means consisting of a cam device mounted on the reciprocating plate and adapted to being advanced a uniform distance at each revolution of said tool by means carried on the tool holder.

21. The machine described in claim 19 above, comprising means whereby the amplitudes of the reciprocating plate are reduced a constantly increasing amount at each reciprocation, said means comprising a rack, a worm, means for rotating the worm upon movement of the rack, and a cam device for advancing said rack mounted on said reciprocating plate and adapted to being advanced a uniform distance at each reciprocation of said plate.

22. In a machine for generating quadric surfaces, either internal or external, on a work piece, a planing tool having a shank terminating in a cutting point, means for moving the tool in predetermined elliptical paths, means for actuating the tool, whereby the cutting point may describe true ellipses on the work piece, and means by which the magnitude of one or both of the elliptical axes may be progressively varied in a predetermined manner.

23. In a machine for generating quadric surfaces, either internal or external, on a work piece, a planing tool having a shank terminating in a cutting point, means for moving the tool in predetermined elliptical paths, means for actuating the tool, whereby the cutting point may describe true ellipses on the work piece, means by which the magnitude of one or both of the elliptical axes may be progressively varied in a predetermined manner, and means for advancing the work piece relative to the tool in a predetermined, curved path.

JOHN F. PAGENDARM.